United States Patent [19]

Kühling

[11] Patent Number: 4,708,314
[45] Date of Patent: Nov. 24, 1987

[54] ADJUSTABLE MARKING DEVICE FOR USE IN MOLD WALL

[75] Inventor: Franz Kühling, Lohne, Fed. Rep. of Germany

[73] Assignee: Hasco Normalien Hasenclever & Co., Ludenscheid, Fed. Rep. of Germany

[21] Appl. No.: 837,505

[22] Filed: Mar. 7, 1986

[30] Foreign Application Priority Data

Mar. 15, 1985 [DE] Fed. Rep. of Germany ....... 3509274

[51] Int. Cl.$^4$ .............................................. B29C 33/00
[52] U.S. Cl. ..................................... 249/103; 164/229; 164/303; 249/104; 249/140; 425/190; 425/192 R
[58] Field of Search ........................ 164/284, 303, 229; 249/103, 104, 140; 425/183, 186, 188, 192 R, , 577, 468, 595, 190

[56] References Cited

U.S. PATENT DOCUMENTS

| 4,315,727 | 2/1982 | Black | 425/595 |
| 4,384,702 | 5/1983 | Boskovic | 249/103 |

FOREIGN PATENT DOCUMENTS

| 1929875 | 6/1971 | Fed. Rep. of Germany . |
| 8233634.2 | 2/1983 | Fed. Rep. of Germany . |
| 3509274 | 9/1986 | Fed. Rep. of Germany . |

Primary Examiner—Jay H. Woo
Assistant Examiner—Timothy W. Heitbrink
Attorney, Agent, or Firm—Karl F. Ross; Herbert Dubno; Andrew Wilford

[57] ABSTRACT

A die for processing a pliable plastic moldable material, particularly a plastic resin, has a cylindrical circular cross sectioned passage provided in the die wall. A marking device for the die comprises a ring body held space-fixed in the cylindrical circular cross sectioned passage of the die and a cylindrical circular cross sectioned central body received rotatable, coaxial, and stepwise lockable in the ring body. Both the front surface of the central body and the ring shaped front surface of the ring body form part of the embossing surfaces of the die. The rotatable front surface of the central body carries an indicating mark, while the space-fixed ring shaped front surface of the ring body adjoining the rotatable front surface of the central body is provided with a number of other marks, which can give the date or dates. The marking device can advantageously be constructed as a standardized part and is easily mounted in the die, without which the embossing die must be provided with additional marks on its embossing surfaces. For a case in which the marking assembly must be changed due to for example a date change, the central body is conveniently adjustable by a tool from the die space.

8 Claims, 4 Drawing Figures

ADJUSTABLE MARKING DEVICE FOR USE IN MOLD WALL

FIELD OF THE INVENTION

My present invention relates to an injection molding or pressing die for a plastically moldable mass, especially a synthetic resin, and, more particularly, to an injection molding or pressing die having a marking device for embossing or marking molded products.

BACKGROUND OF THE INVENTION

A die for processing plastically moldable material, especially a synthetic resin or plastic, can have a circularly cylindrical cross-section passage provided in a wall of the die which opens onto an embossing surface of the die.

A rotatable cylindrical marking device which can be held fixed in a particular rotational position is inserted in this cylindrical passage in the die. The front surface of this marking device forming part of the embossing surface of the die has at least one mark which correlates with at least one stationary marking on an adjoining part of the embossing surface.

An injection molding or pressing die for this purpose has an adjustable cylindrical circular cross-section device mounted flush with the embossing surface for applying different marks to the product of the die. The front surface of this known marking device is provided as part of the embossing surface of the die with one or more marks, which are either raised from or recessed in that front surface. For example, these marks can comprise month-indicating characters. The adjoining embossing surface of the die is provided in the immediate vicinity of the front surface of the marking device with a reference marking, which is reproduced in the article formed as a product by the die as a dashed line or line-type raised or depressed marking.

The known marking device is made for the special case of injection molding or pressing dies and of course is inserted in a wall of the die.

OBJECTS OF THE INVENTION

It is an object of my invention to provide an improved injection molding or pressing die for a plastic material which has a simplified and more versatile marking or embossing device.

It is also an object of my invention to provide an improved injection molding or pressing die for a plastic material, which has a marking device having a simpler structure than the marking device of known injection molding or pressing dies.

It is another object of my invention to provide an improved injection molding or pressing die for a plastic material, which has a marking device having a more precise, problem-free adjustability than prior marking devices for the purposes described.

SUMMARY OF THE INVENTION

These objects and others which will become more readily apparent hereinafter are attained in accordance with my invention in an injection molding or pressing die for a plastically moldable material, particularly a synthetic resin or plastic, having a cylindrical circular cross section passage provided in a wall or the die which opens onto an embossing surface of the die, in which a rotatable, but securable, cylindrical marking device is inserted, whose front surface forming part of the embossing surface is provided with at least one mark which correlates with at least one nonrotatable marking on an adjoining part of the embossing surface of the die.

According to my invention the marking device comprises a ring body or sleeve held nonrotatable in the cylindrical circular cross section passage and a rotatable, coaxial, and stepwise arrestable cylindrical circular cross section central body received in the ring body.

The rotatable front surface of the cylindrical circular cross section central body carries one of the marks, while the nonrotatable circular ring shaped front surface of the outer ring body adjoining the rotatable front surface of the cylindrical cross-section central body is provided with the remaining marks.

The marking device of my invention has the advantage that it allows adjustment of the setting of the various dates indicating marks or mark independently of any features on the embossing surface of the die, while in the previously described known injection molding or pressing die a reference character must be provided in the embossing surface of the die.

In contrast to the earlier system, according to my invention, a date ring for example having a plurality of month or year indicating marks, is engraved on the front surface of the ring body. The front surface of the central body has only the reference mark or the indicating character, for example a central and radially embedded reference arrow.

It is important that the ring body and the central body be joined together in such a way that they are both replaceable. Thus particularly for standardization a simpler manufacture and mounting is possible because the ring body having date marks or indicia is associated with the central body having only one reference character or index (e.g. a single reference arrow), which can be a month or year indicating mark.

It is also important that the central body be adjustably positionable and lockable in steps relative to the ring body surrounding it. In my invention the lock step size is selected so that it coincides with the circumferential spacing of the marks. The lock steps provide an unequivocally exact selectability of the desired marks, and hence the date. The locking force between the locking elements fitting with each other is such that once set, an unintentional adjustment to another position is not possible.

For stepwise positioning of the cylindrical circular cross section central body a resilient insertable piece with a lock bolt is mounted in the rear end portion of the central body, which cooperates with a plurality of lock grooves in the inner surface of the ring body.

Advantageously the plurality of the lock grooves are present in the same number as the remaining ones of the marks. The ring body for receiving the cylindrical circular cross sectioned central body has a stepped passage through it with an enlarged part in the axial region furthest from the embossed surface of the die.

The enlarged part of the stepped passage forms a ring shaped arresting shoulder on which a rear circular collar of the cylindrical circular cross sectioned central body abuts. The axial region of the ring body furthest from the embossed surface has a rear circular collar or stepped recess formed to receive the rear circular collar or shoulder of the cylindrical central body. The cylindrical circular cross section passage in the die is formed as a stepped hole to match the outer shape of the ring body.

The circular collar of the cylindrical cross section central body has a radial threaded hole penetrating through the circular collar for receiving the insertable piece, which is provided with an external thread, wherein the lock ball is mounted on the insertable piece. This insertable piece is fixed in position by a set screw mounted in the cylindrical circular cross section central body. The front surface of the cylindrical cross sectioned central body is provided with only one of the marks, which extends radially and is positioned centrally.

One of the marks on the front surface of the cylindrical cross sectioned central body also provides an operating surface for a tool, for example the mark can be simply a slot and the tool can be a screwdriver.

In another embodiment of my invention the rear surface of the cylindrical cross section central body furthest from the embossing surface is provided with an operating surface for a tool; for example the operating surface can be a slot and the tool can be a screwdriver.

Finally the rear surface of the ring body is planar and extends flush with the planar rear surface of the central body. The front surfaces of the ring body and the central body are substantially planar and the front surface of the ring body extends flush with the front surface of the central body.

BRIEF DESCRIPTION OF THE DRAWING

The above and other objects, features, and advantages of my invention will become more readily apparent from the following description, reference being made to the accompanying drawing in which.

SPECIFIC DESCRIPTION

Figures 1A, 1B:
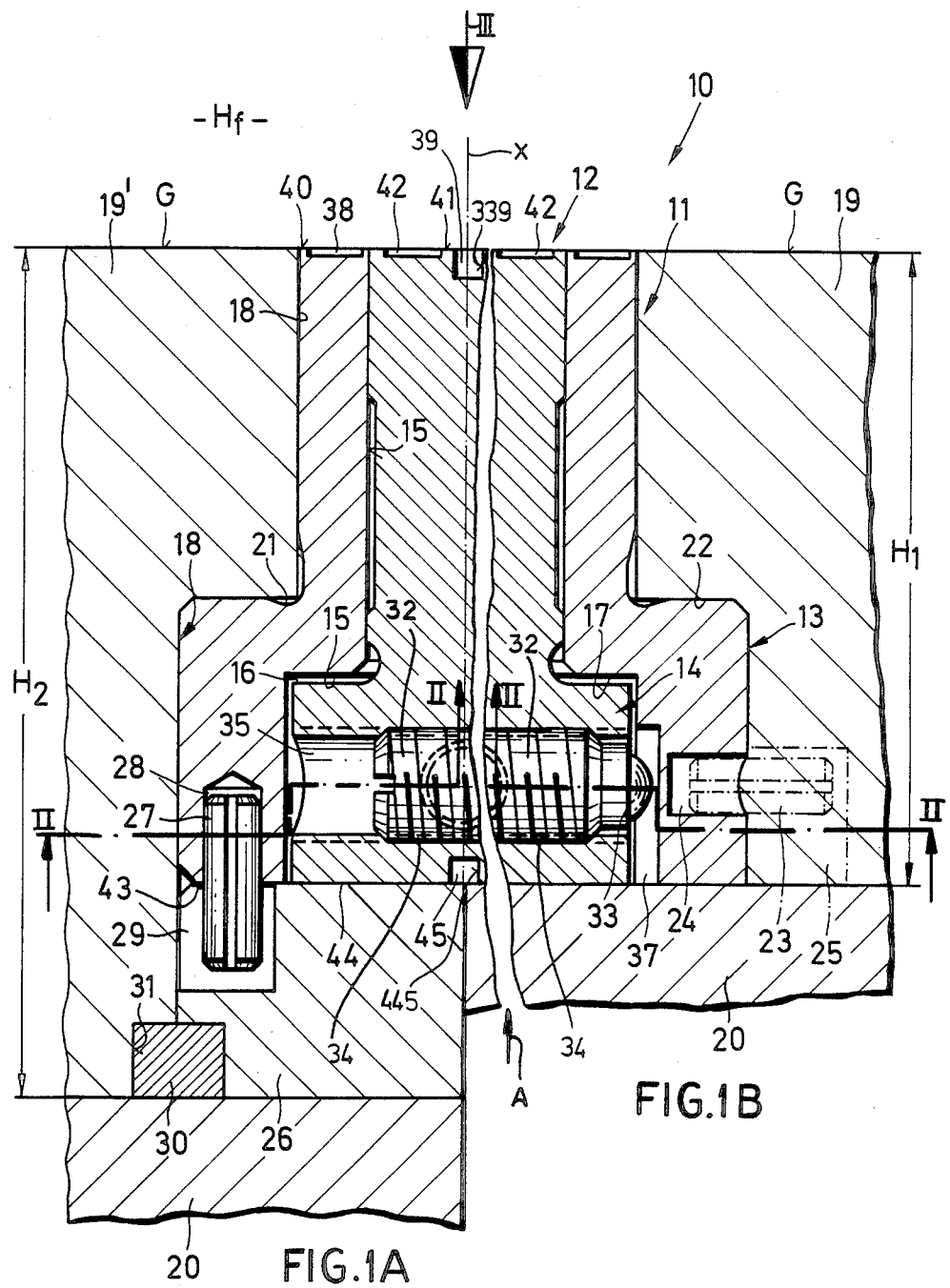
FIGS. 1A and 1B are respective axial cross sectional view on a scale 5:1 of dies having marking devices according to my invention.
Figure 2:
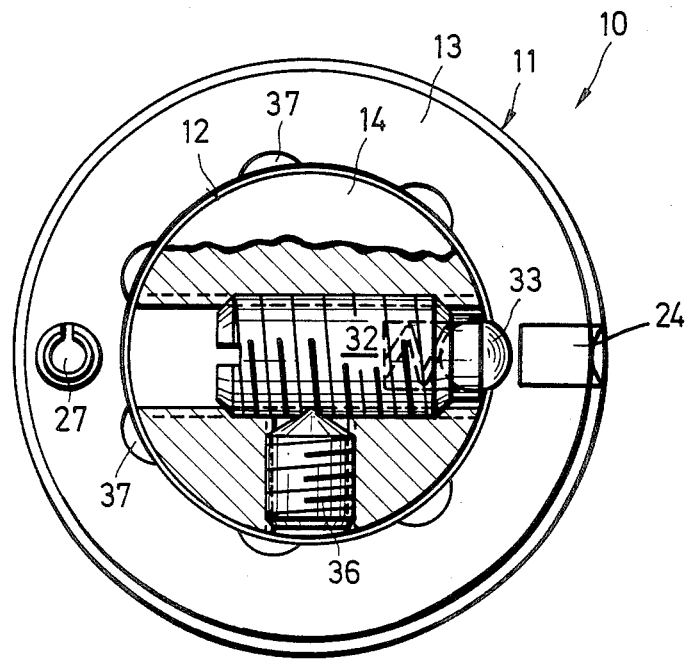
FIG. 2 is an end view on a scale of approximately 5:1 of the marking device of FIGS. 1A and 1B removed from the die and generally seen in section along line II—II of FIGS. 1A and 1B.

The marking device 10 of the insertable molding or pressing die shown in the drawing comprises an outer circular cross sectioned ring body 11 and an inner circular cross sectioned central body 12. The circular cross sectioned ring body 11 is provided with a rear collar 13, which corresponds to a rear circular collar 14 of the central body 12 at approximately the same axial location. For receiving the interchangeable circular cross section central body 12 the ring body 11 has a stepped passage 15 whose enlarged part 16 acts to hold the circular collar 14 of the inner central body 12.

Both structural components 11 and 12 are constructed so as to be rotationally symmetrical, that is, as circular cylinders. For mounting the marking device 10, the inner circular cross section central body 12 is pushed into the ring body 11 in the direction of arrow A in FIG. 1A.

The ring shaped arresting shoulder 17 provides a limit stop for the plug in central body 12.

From FIGS. 1A and 1B it is apparent that the marking device 10 is mounted in a stepped hole 18 of a die plate and/or of a die wall 19. The die wall 19 can have either a thickness $H_1$ corresponding to that shown on the right side in FIG. 1B or a larger thickness $H_2$ corresponding to that of the die wall 19' shown on the left side in FIG. 1A.

For the case where the die wall 19 has thickness $H_1$ the axial length of the marking device 10 measured along its central rotation axis X equals the thickness $H_1$ of the die wall 19. For mounting the marking device 10 is pushed in the direction of the arrow A in FIGS. 1A and 1B. Adjacent the place where the marking device 10 is inserted, die holding plate 20 is mounted. It provides support under the die wall and/or the die plate 19 and the marking device 10 and may be positioned axially slidably flush behind the marking device 10.

The widened portion of the stepped hole 18 which receives the circular collar 13 is indicated with reference numeral 21. The arresting shoulder formed in the stepped hole 18 which supports the circular collar 13 is indicated by reference numeral 22.

For the case where the die wall 19 has a thickness amounting to $H_1$ the marking device 10 is prevented from rotation by a spring split pin 23 shown with dashed lines in FIG. 1B. This extends into a blind hole 24 of the circular collar 13 oriented radially and opening toward the exterior and engages simultaneously in a cavity 25 of the die wall 19 opening toward die holding plate 20 and shown with dashed lines in FIG. 1B. The transverse width of the cavity 25 corresponds to the outer diameter of the spring cotter 23.

For the case where the thickness of the die wall 19' is $H_2$, a spacing disk or shim 26 must be inserted in the region under the stepped hole 18, and fits tightly in the intervening space between the die holding plate 20 and the marking device 10. In this case to prevent the rotation of the marking device 10, another split pin spring or cotter 27 is inserted into an axial hole 28 in the circular collar 13.

Simultaneously the spring cotter 27 engages in a cavity 29 opening toward the marking device 10 in the spacing disk adjacent its edge. The transverse width of the recess 29 is the same as the outer diameter of the spring cotter 27.

The spacing disk 26 is finally fixed in position by a spacing member 30, which is positioned in a joint cavity 31 formed in die wall 19 and in the spacing disk 26.

To lock the central body 12 stepwise so that it is held nonrotatably in position, an insertable piece or screw 32 is provided in the circular collar 14 of the central body 12. The insertable piece 32 has a spring-loaded indexing ball 33 attached and, since it is provided with an exterior thread 34, is screwed into a radial threaded hole 35 in the circular collar 14. The insertable piece 32 is secured in position by a set screw 36 extending transversely to threaded hole 35 and held in circular collar 14.

The lock ball 33 cooperates with a plurality of lock grooves 37 which each have a part-cylindrical cross-section and which are provided on the inner surface of the circular collar 13.

Figure 3:
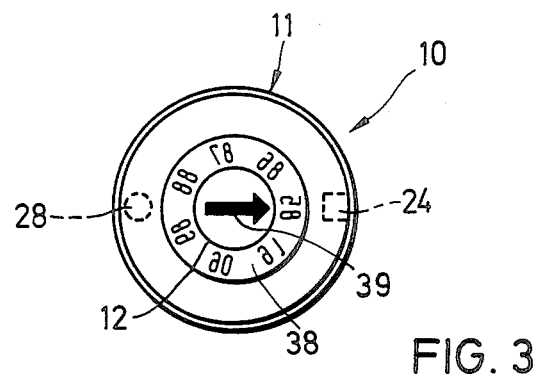
FIG. 3 is a front elevational view on a scale of approximately 2:1 of the marking device of FIG. 1 removed from the rest of the die as seen in a direction corresponding to that shown by the arrow III of FIG. 1A.

As seen from FIG. 3 the inner surface of the circular collar 13 has seven indexing and lock grooves 37, which are associated and aligned with different year indicating marks designating the years 1985, . . . , 1991. The lock grooves 37 may be made comparatively simply either by a milling cutter or a drill.

The numbers for the year 1985–1991 form nonrotatable marks 38. A rotatable mark 39 can be set relative to these space-fixed marks 38 to indicate a date. The entire adjustable assembly can be secured so that the lock ball 33 engages in a particular lock groove 37. The front surfaces carrying the marks 38 and 39 are indicated at 40 (a nonrotatable ring shaped front surface of the circular body 11) and with 41 (a rotatable front surface of the central body 12) respectively.

The front surfaces 40 and 41 thus form a part of the embossing surfaces G of the die wall 19, which bound the die cavity indicated at $H_f$.

When as in the present case the rotatable marking 39 formed as an arrow is a slot having an operating surface 339 in which the tip of a tool such as a screwdriver fits, the central body 12 can be displaced into another position when the die cavity is open. According to FIG. 1 additional structural marks 42 in the front surface 41 are provided, which may have more than one ornamental character positioned raylike about the central indicating mark 39.

Also the rear surfaces 43 and 44 of the circular body 11 and/or central body 12 are mounted flush with each other. The rear surface 44 of the central body 12 likewise is provided with an engaging slot 45 having an operating surface 445 for the tip of a tool such as a screwdriver. In this way it is possible to rotate the central body from the rear—with the die holding plate 20 removed.

In this embodiment it is clear that marking device 10 is an easily constructed replaceable standardizable item. The central body 12 can cooperate in the described or in a similar way with a different ring body 11. Furthermore the front surface 40 of the ring body 11 can be provided with twelve months-indicating digits and with twelve lock grooves 37 corresponding to them so that the month can be embossed instead of the year.

I claim:

1. In combination with a mold for shaping a plastically moldable material and having a mold wall having an inner surface adapted to contact said material, an outer surface, and a stepped bore in said wall extending between and opening at both of said surfaces, a marking device received in said bore and having an end lying generally along said inner surface for marking an article formed by said material in said mold against said inner surface, said marking device comprising:

an axially elongated cylindrical stepped ring body received in said stepped bore and shaped complementarily thereto, said ring body having a small-diameter annular end terminating at said inner surface and a large-diameter annular end remote from said inner surface and exposable at said outer surface, said ring body having a stepped passage extending axially therethrough with a small passage step opening at said small-diameter end and a large passage step opening at said large-diameter end, said passage steps defining between them an annular shoulder turned away from said small-diameter end and transverse to an axis of said device;

means for fixing said ring body in said bore with said small-diameter end flush with said inner surface;

an axially elongated central body of circularly cylindrical cross section rotatably received in said stepped passage and formed with a large-diameter circular collar adapted to abut said shoulder and a cylindrical shank extending from said collar through said small passage step, said shank having an inner end carrying at least one marking formation adjacent said small-diameter end and an outer end exposable at said outer surface, said small-diameter end of said ring body being circular and provided with a plurality of other marking formations selectively cooperating with said formation on said inner end of said shank;

indexing means for arresting said central body relatively angularly in any of a plurality of respective positions in each of which the formation on said inner end of said shank is angularly aligned with a selected respective one of said formations on said small-diameter end of said ring body to set the marking applied to said article; and means including a formation on the outer end of said central body and accessible at said outer surface for rotating said central body in said ring body through said positions.

2. The marking device defined in claim 1 wherein said indexing means includes a plurality of angularly spaced grooves formed in said large passage step of said ring body, and an indexing ball mounted in said collar and resiliently biased into selective engagement with said grooves.

3. The marking device defined in claim 2 wherein said grooves are provided in the same number as said other formations and with equal angular spacing.

4. The marking device defined in claim 3 wherein said collar is formed with a radial threaded hole receiving a threaded member bearing on said ball.

5. The marking device defined in claim 4, further comprising a setscrew threaded into said collar and locking said threaded member in place.

6. The marking device defined in claim 5 wherein said end of shank has only a single marking formation which is disposed centrally and extends radially of said end of said shank.

7. The marking device defined in claim 5 wherein said formation of the inner end of the central body shank is a slot for a screwdriver blade.

8. The marking device defined in claim 5 wherein said collar has an end surface at the outer end of said central body opposite said end of said shank and flush with an end surface of said ring body.

* * * * *